United States Patent
Taivalsaari et al.

(10) Patent No.: US 6,366,898 B2
(45) Date of Patent: Apr. 2, 2002

(54) METHOD AND APPARATUS FOR MANAGING CLASSFILES ON DEVICES WITHOUT A FILE SYSTEM

(75) Inventors: Antero Taivalsaari, Cupertino; William Bush, San Mateo, both of CA (US)

(73) Assignee: Sun, Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/158,121

(22) Filed: Sep. 21, 1998

(51) Int. Cl.$^7$ ................................................ G06F 17/30
(52) U.S. Cl. ................... 707/1; 707/4; 707/7; 707/10; 709/206; 709/202; 709/218; 709/227; 709/250; 717/4
(58) Field of Search ................................ 707/1, 7, 103, 707/206; 709/227, 247, 219; 713/200; 395/704, 705

(56) References Cited

U.S. PATENT DOCUMENTS

| | | | |
|---|---|---|---|
| 5,848,274 A | * 12/1998 | Hamby et al. | 395/705 |
| 5,958,013 A | * 9/1999 | King et al. | 709/227 |
| 5,966,702 A | * 10/1999 | Fresko et al. | 707/1 |
| 5,983,348 A | * 11/1999 | Ji | 713/200 |
| 5,999,972 A | * 12/1999 | Gish | 709/219 |
| 6,018,628 A | * 1/2000 | Stoutamire | 395/705 |
| 6,026,237 A | * 2/2000 | Berry et al. | 395/704 |
| 6,038,572 A | * 3/2000 | Schwartz et al. | 707/206 |
| 6,092,120 A | * 7/2000 | Swaminathan et al. | 709/247 |
| 6,182,119 B1 | * 1/2001 | Chu | 707/10 |

FOREIGN PATENT DOCUMENTS

WO 9840805 9/1998

OTHER PUBLICATIONS

Munson, Jonathan P. and Prasun Dewan "Sync: A Java Framework for Mobile Collaborative Applications," IEEE Jun. 1997 pp. 59–66.

* cited by examiner

Primary Examiner—Hosain T. Alam
Assistant Examiner—Anh Ly
(74) Attorney, Agent, or Firm—The Hecker Law Group

(57) ABSTRACT

The invention provides a method of creating and periodically loading a database of classfiles on a non traditional computer device, such as a PDA (personal digital assistant), cellular telephone, pager, appliances, or other embedded device. A resident Java virtual machine loads classes from this database instead of loading them from a file system. The embedded device is periodically updated by connecting it to a network or computer that includes a classfile source. At this time, records can be added to, or deleted from, the database (where the records are classfiles). The management of the classfile database on the embedded device is independent of the virtual machine on the embedded device. One embodiment of the invention comprises an embedded device with a virtual machine, a classfile database, a database manager, and a remote database loader. The embedded device and virtual machine can function even when not connected to the classfile source.

38 Claims, 14 Drawing Sheets

METHOD AND APPARATUS FOR MANAGING CLASSFILES ON DEVICES WITHOUT A FILE SYSTEM

BACKGROUND OF THE INVENTION

1. Field of the Invention

This invention relates to the field of computer file systems.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Solaris, Java, JavaOS, JavaStation, HotJava Views and all Java-based trademarks and logos are trademarks or registered trademarks of Sun Microsystems, Inc. in the United States and other countries.

2. Background

Embedded Devices

The use of platform independent programming languages, such as the Java™ programming language, has been adapted for use in non traditional computing environments. These environments include limited resource devices, referred to as "embedded" devices and include cell phones, "personal digital assistants" (PDAs), smart cards, appliances, and other environments that may lack the number and size of traditional computer system resources. For example, such limited resource devices may have limited memory, reduced processing power, and simple or no operating systems. Such limited resources can prevent the use of some programming languages on the limited resource device. One disadvantage, for example, of embedded devices is the absence of a traditional file system. This creates an obstacle to the ability to access files required by a programming language and makes it difficult to upgrade or change software versions, applications, classfiles and/or features of an embedded device.

Example Embedded Device (Personal Digital Assistant (PDA))

One example of an embedded device is a PDA. FIG. 13 illustrates a PDA, such as the PalmPilot produced by 3Com Corporation. PDA device 1300 is equipped with touch screen display 1305, mechanical buttons (1306 and 1307), a stylus (not shown), and serial port 1302. A universal asynchronous receiver transmitter (UART) 1301 is used to convert information from the PDA for transmission through serial port 1302, and to convert serial information received through serial port 1302. Mechanical buttons 1306 are provided for user input, such as for the selection of predefined applications. Mechanical buttons 1307 are provided for scrolling graphics on touch screen display 1305.

Touch screen display 1305 is separated into application display area 1308 and user input area 1309. Application display area 1308 displays the graphical output of the current application being executed by PDA device 1300. User input area 1309 contains software buttons 1310, alphabet script input area 1311, and numeric script input area 1312. Software buttons 1310 are for performing system or application-based selection operations. Alphabet script input area 1311 is used to enter alphabetical characters with the electronic stylus. Similarly, numeric script input area 1312 is used to enter numeric characters with the electronic stylus. Character recognition software within the PDA converts user input in areas 1311 and 1312 into data characters.

An advantage of platform independent programming languages such as the Java programming language is the ability to load components of a program, such as an applet, at runtime. (This behavior is specified in the Java Language Specification (JLS) in section 12.2 (pages 218–9) and in the Java Virtual Machine Specification (JVMS) in section 2.16.2 (page 43) and is accomplished with a class loader, a part of the Java virtual machine.

Because PDAs do not typically have access to a file system (e.g. through a network connection) from which classfiles can be loaded, standard class loading techniques cannot be used. One solution is to preload classfiles into a non-volatile memory, such as a ROM (read only memory). This lacks flexibility.

SUMMARY OF THE INVENTION

The invention provides a method of creating and periodically loading a database of classfiles on a non traditional computer device, such as a PDA (personal digital assistant), cellular telephone, pager, smartcard, Java Ring, or other embedded device. A resident Java virtual machine loads classes from this database instead of loading them from a file system. The embedded device is periodically updated by connecting it to a network or computer that includes a classfile source. At this time, records can be added to, or deleted from, the database (where the records are classfiles). The management of the classfile database on the embedded device is independent of the virtual machine on the embedded device. One embodiment of the invention comprises an embedded device with a virtual machine, a classfile database, a database manager, and a remote database loader. The embedded device and virtual machine can function even when not connected to the classfile source.

DETAILED DESCRIPTION OF THE INVENTION

Figure 1A:
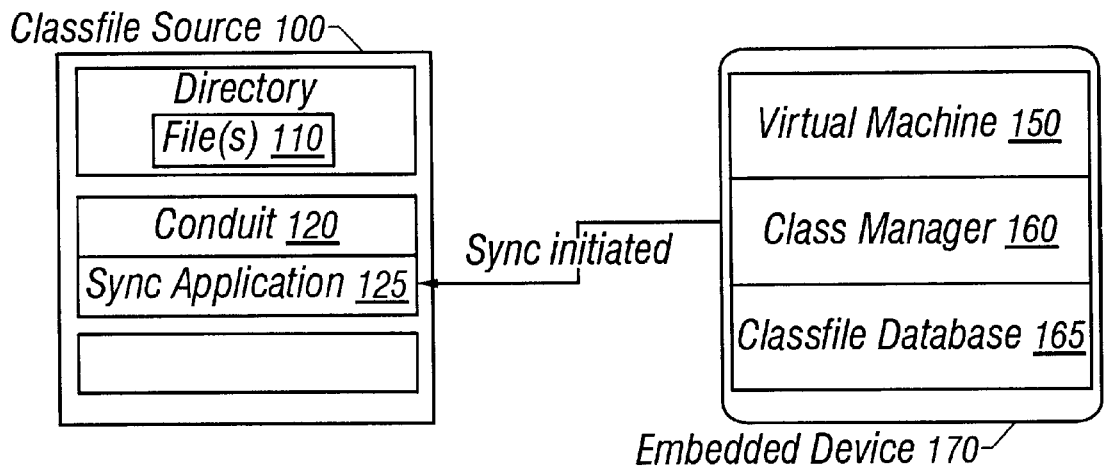
FIGS. 1A–1C illustrate a graphical representation of the applications executing on an embedded device 170 (such as a PDA) and a classfile source 100.

The invention is a method and apparatus for managing classfiles on a device without a file system. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

For purposes of illustration, embodiments of the invention are described herein with reference to personal digital assistants. Embodiments of the invention can be similarly applied to any form of processor driven device, such as digital wallets, desktop computers, laptop computers, beepers, telephones, smart cards, Java Rings and others. An embodiment of the invention uses the Java programming language. Background on the Java programming language and object oriented programming is described below.

Java Programming and Execution

An embodiment of the software apparatus of the invention is implemented in the Java programming language. The Java programming language is an object-oriented programming language with each program comprising one or more object classes and interfaces. Unlike many programming languages, in which a program is compiled into machine-dependent, executable program code, Java classes are compiled into machine independent bytecode classfiles. Each classfile contains code and data in a platform-independent format called the classfile format. The computer system acting as the execution vehicle supports the Java runtime environment. The runtime environment contains a program called a virtual machine, which is responsible for executing the code in Java classes.

Applications may be designed as standalone Java applications, or as Java "applets" which are identified by an applet tag in an HTML (hypertext markup language) document, and loaded by a browser application. The classfiles associated with an application or applet may be stored on the local computing system, or on a server accessible over a network. Each class is loaded into the runtime environment, as needed, by the "class loader."

The classes of an applet are loaded on demand from the network (stored on a server), or from a local file system, when first referenced during the applet's execution. The runtime environment locates and loads each classfile, parses the classfile format, allocates memory for the class's various components, and links the class with other already loaded classes. This process makes the code in the class executable by the virtual machine.

Java classfiles may be identified in applet tags within an HTML (hypertext markup language) document. To provide a client with access to classfiles from a server on a network, a web server application is executed on the server to respond to HTTP (hypertext transport protocol) requests containing URLs (universal resource locators) to HTML documents, also referred to as "web pages." When a browser application executing on a client platform receives an HTML document (e.g., as a result of requesting an HTML document by forwarding a URL to the web server), the browser application parses the HTML and automatically initiates the download of the bytecode classfiles when it encounters the applet tag in the HTML document.

Memory is allocated to store and execute the downloaded applet. The allocation of memory to new applets may lead to a low memory condition as the number of applets in the Java runtime environment grows. To resolve the low memory condition, older, invisible applets (i.e., applets that are not currently visible on a display) may be unloaded, or "destroyed" (i.e., shutdown and deallocated), to release memory. An applet thus destroyed can no longer enact user notification functions when events occur that are relevant to the destroyed applet.

The Java language developed by Sun Microsystems has provided a way to write platform independent applications to run on the World Wide Web and provide the desired compatibility. Some platforms may have unique and/or proprietary interfaces, limited memory and display sizes, constrained power consumption, and limited physical space. These platform are referred to here as restrictive environments and represent the environment found on many embedded devices. A version of the Java programming language has been developed by JavaSoft to be used with, among other things, restrictive environments. A description of the Java programming language and the platform for restrictive environments can be found at web site "http://www.java.sun.com".

Object-Oriented Programming

Object-oriented programming is a method of creating computer programs by combining certain fundamental building blocks, and creating relationships among and between the building blocks.

The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines the components of an object that typically including the variables and methods for the class. A class is used to create a particular instance of itself. An instance of an object class includes a unique set of the variables defined for the class. Multiple instances of the same class can be created from a class. Each instance that is created from the class is said to be of the same class.

To illustrate, an employee class can include "name" and "salary" instance variables and a "set_salary" method. Instances of the employee class can be created, or instantiated for each employee in an organization. Each instance is said to be of type "employee." Each employee instance includes "name" and "salary" instance variables and the "set_salary" method. The values associated with the "name" and "salary" variables in each employee instance contain the name and salary of an employee in the organization. A message can be sent to an employee's employee instance to invoke the "set_salary" method to modify the employee's salary (i.e., the value associated with the "salary" variable in the employee's employee object).

A hierarchy of classes can be defined such that a class definition has one or more subclasses. A subclass inherits its parent's (and grandparent's etc.) definition. Each subclass in the hierarchy may add to or modify the behavior specified by its parent class. Some object-oriented programming languages support multiple inheritance where a subclass may inherit a class definition from more than one parent class. Other programming languages support only single inheritance, where a subclass is limited to inheriting the class definition of only one parent class. The Java programming language also provides a mechanism known as an "interface" which comprises a set of constant and abstract method declarations. A class can implement the abstract methods defined in an interface. Both single and multiple inheritance are available to an interface. That is, an interface can inherit an interface definition from more than one parent interface.

Limited Resource Device Virtual Machine

A problem to be solved in providing a programming language on a limited resource device is to provide a virtual machine that can execute on the device, and provide a system for serving needed classfiles to the virtual machine. One embodiment of the invention uses a small virtual machine referred to as the embedded virtual machine (EVM). One version of the EVM takes only a few tens of kilobytes (on the order of 30 to 50 kilobytes of static memory depending on compilation and debugging options). However, the invention contemplates the use of EVMs of any size. The EVM supports platform-independent multithreading, copying garbage collection, optional quick byte codes, most of the non-graphical libraries in JDK 1.1. (or any other JDK version or any other developer kit) and other typical features of Java programming language.

An embodiment of the invention uses a version of EVM modified to run on the PalmPilot organizer. The invention is described herein in connection with its operation on the PalmPilot organizer. However, the present invention applies to any embedded device or restrictive computing environment because it has the ability to be disconnected from a classfile source and can operate without a persistent connection to a classfile source.

The embedded virtual machine implementation for the PalmPilot supports the complete Java byte code set (currently excluding long support), full Java class loading, and various PalmPilot native functions. Java classfiles can be loaded onto the PalmPilot from a desktop PC via an extension to the PalmPilot synching software (referred to as HotSync in the PalmPilot environment). As the PalmPilot is a limited resource device, the available RAM for runtime classes is limited to between 30 and 40 kilobytes on the PalmPilot.

The PalmPilot version of the EVM is built around an application known as the class manager. The class manager serves as the primary interface to classes on the PalmPilot, allowing the user to see which classes are available, launch Java applications, see details of classes, and delete them as necessary. Compiled classfiles are moved to the PalmPilot using a special class conduit that communicates with the class manager during a Synching operation. The number of classes on the PalmPilot is limited only by the available RAM on the PalmPilot.

Classfile Source/Embedded Device Operation

Figure 1B:
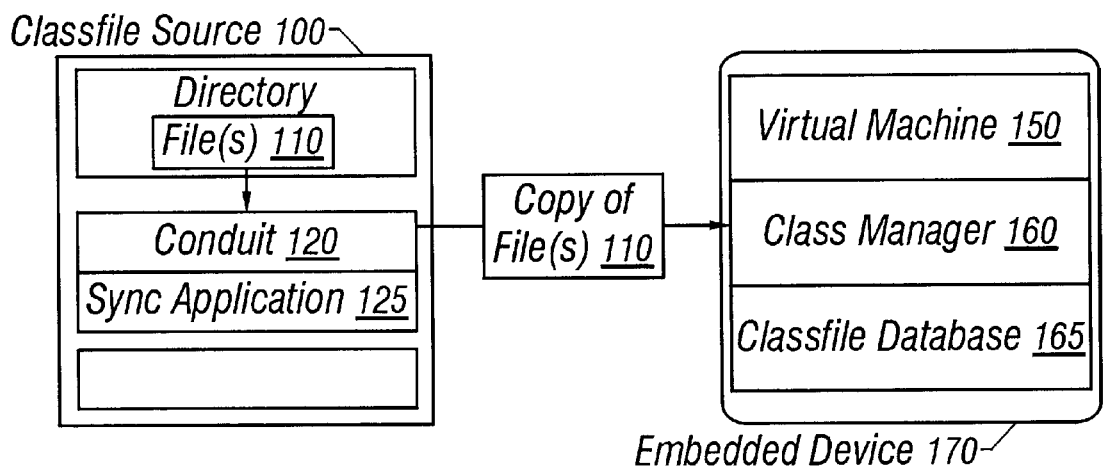
Figure 1C:
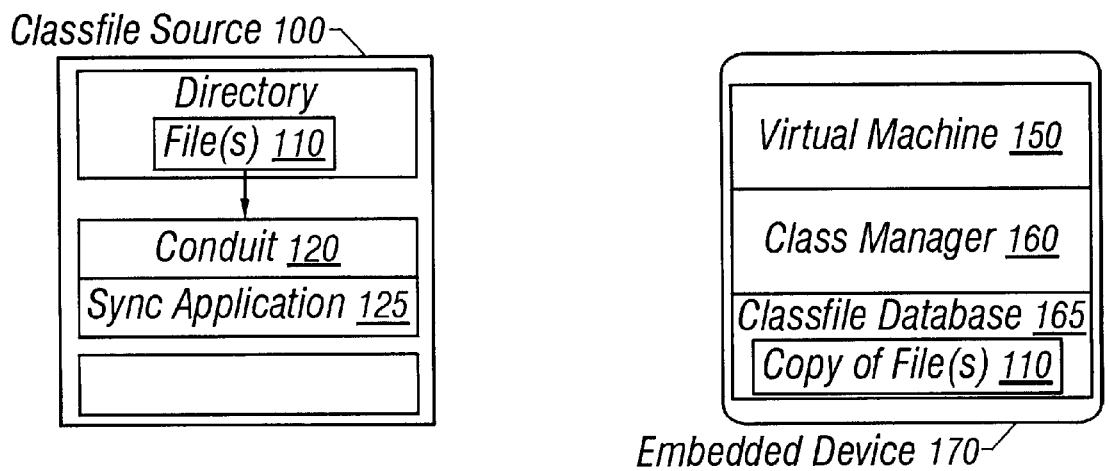
Figure 14:
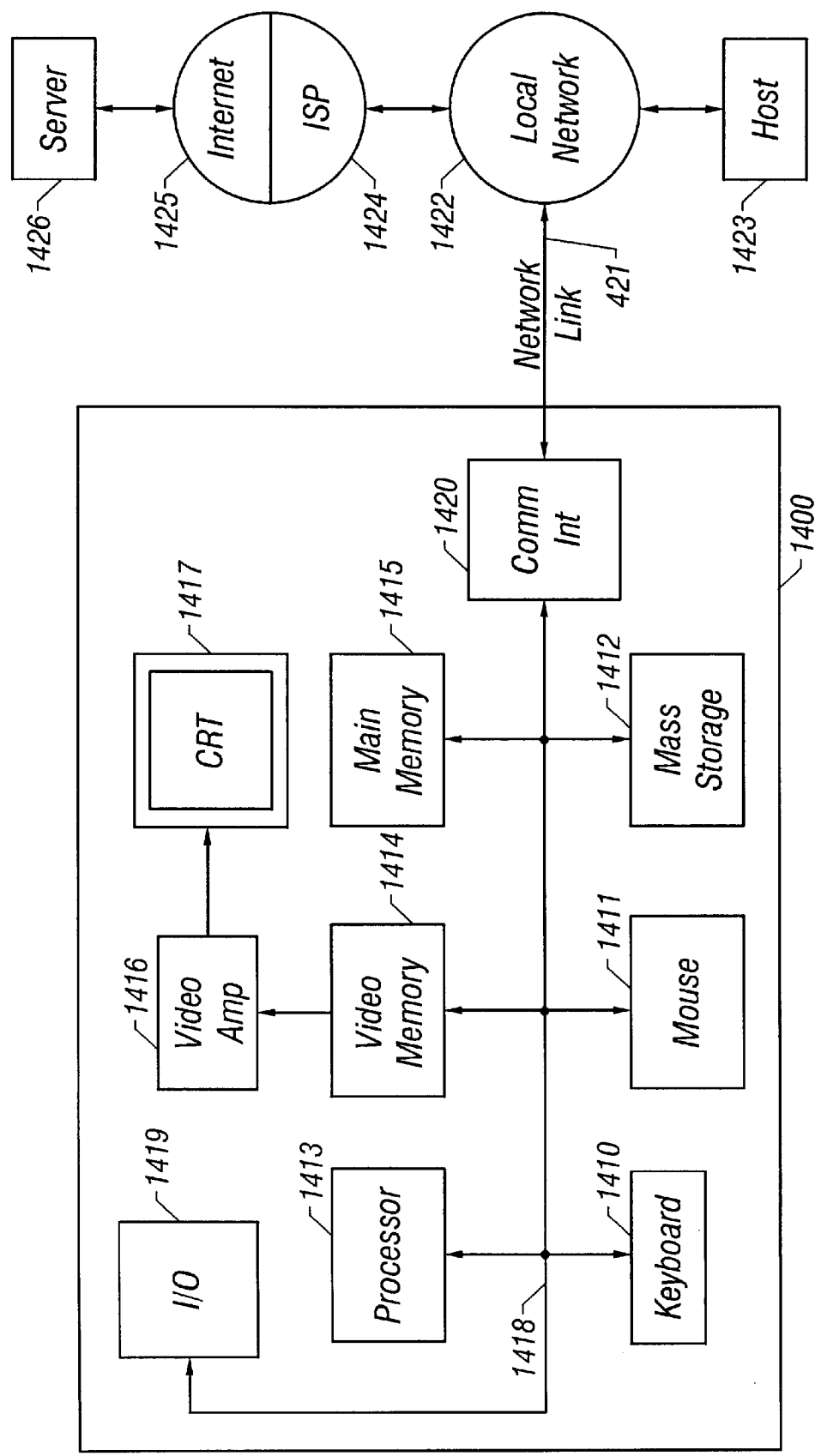
FIG. 14 is a block diagram of a computer system for use with the present invention.

FIGS. 1A&14 1C illustrate a graphical representation of the applications executing on an embedded device 170 and a classfile source 100. Referring first to FIG. 1A, the classfile source 100 includes a directory with files 110, and a conduit 120 cooperatively coupled to a synching application 125 (such as HotSync). The embedded device 170 includes a virtual machine 150 (such as an embedded virtual machine), a class manager 160, and classfile database 165. The conduit 120 performs the functions of creating a connection or path between the embedded device and the classfile source so that classfiles can be transferred as necessary between the classfile source and the embedded device.

The embedded device is capable of executing classfiles found in its local classfile database without connection to the classfile source. Periodically, classfiles can be added, modified, deleted, or replaced by synching the embedded device to a classfile source. During operation, the class manager provides appropriate classfiles to the virtual machine, even in the absence of a file system on the embedded device.

The classfile source 100 may be a network, the world wide web, a single host computer, or any other system or environment for providing a source of classfiles. The classfile source 100 may communicate periodically with the embedded device. A network link can typically provides data communication through one or more networks to other data devices, such as an embedded device. For example, a network link may provide a connection through a local network to a local server computer or to data equipment operated by an Internet Service Provider (ISP). ISP in turn can provide data communication services through the world wide packet data communication network now commonly referred to as the "Internet". A local network and the Internet both use electrical, electromagnetic or optical signals which carry digital data streams. The signals through the various networks and the signals on a network link and through a communication interface, which carry the digital data to and from the embedded device, are exemplary forms of carrier waves transporting the information.

At FIG. 1A, the embedded device 170 is assumed to be in temporary connection with the classfile source 100 (e.g. via a synching cradle, connection to a network, cable, carrier wave, or other communication environment) and initiates a synching operation by communication from the class manager 160 to the synching application 125. At FIG. 1B, the conduit 120 is invoked and sends a copy of files 110 (possibly including classfiles) to class manager 160. At FIG. 1C, the copy of files is stored on the embedded device in the classfile database 165.

Remote Database Loader

The remote database loader resides on a network, computer, or other classfile source that can be connected to the embedded device. For the PalmPilot, the classfile source is a personal computer with a connector that can be coupled to the PalmPilot and software that can communicate with the PalmPilot. In one embodiment, the connection software is a conduit of the PalmPilot Hot Sync application and it sends selected classfiles from the computer to the database on the PalmPilot during a Hot Sync operation. Compiled classfiles are moved from the computer system to the PalmPilot using a class conduit that runs on the computer system and communicates with the class manager during synching.

An implementation of the Java programming language must verify a class before executing it (see Java Language Specification [JLS] section 12.3 and the JVMS section 2.16.3). The specification is flexible as to when the verification must be performed. Since the verifier is a relatively large program and separate from the virtual machine, it is impractical to use the verifier on a embedded device. Instead, the verifier can be run on the synching computer system that provides the classfiles, as the classfiles are being loaded into the database on the embedded device.

Conduit Operation

Figure 2:
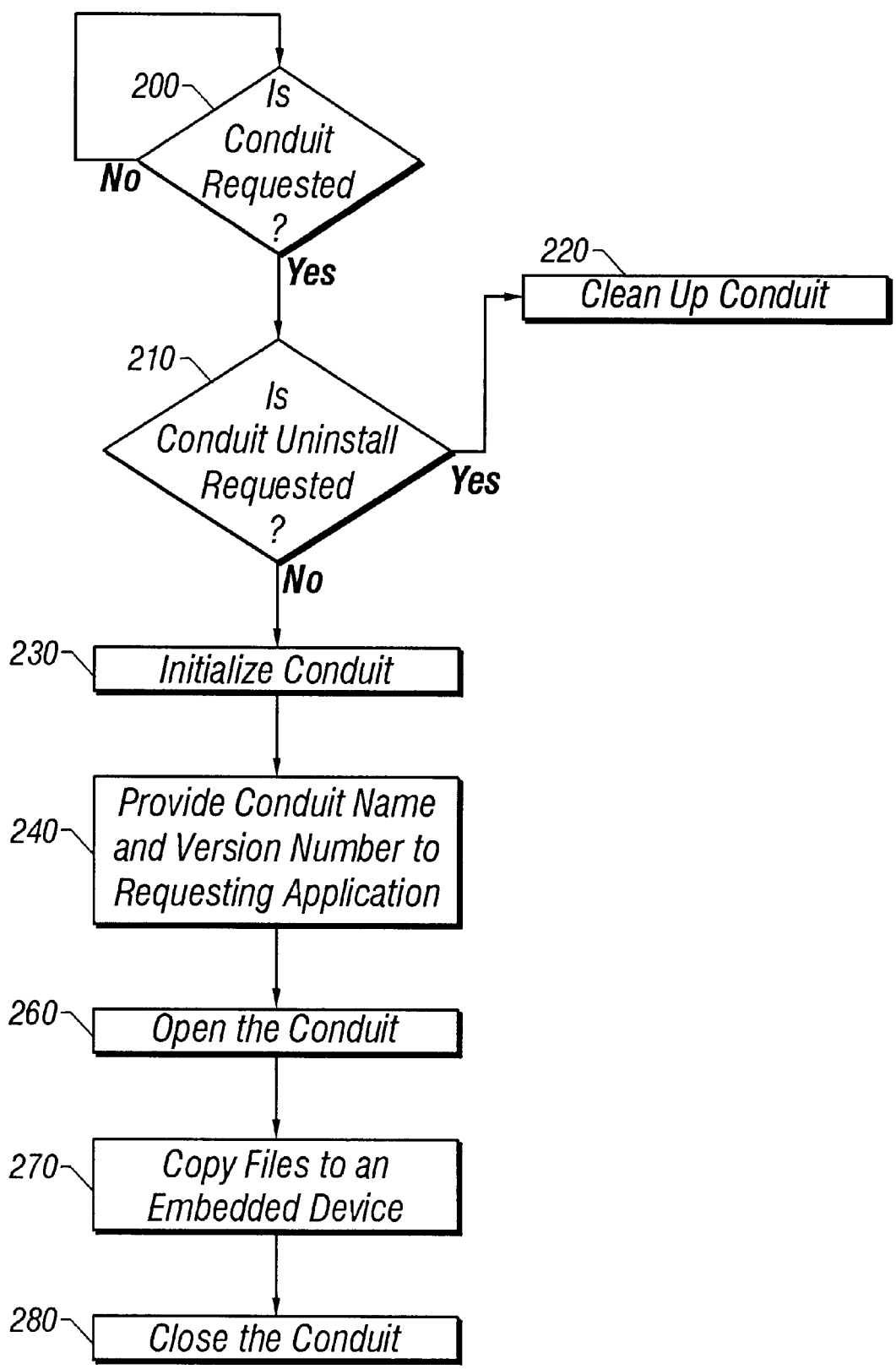
FIG. 2 is a flow diagram illustrating the operation of conduit 120 on the synching computer.

FIG. 2 is a flow diagram illustrating the operation of conduit 120 on the synching computer. At decision block 200, the argument "Is Conduit Requested?" is made. If the argument is false, the system loops back to block 200. If the argument is true, the system proceeds to decision block 210. At block 201 the argument "Is Conduit Uninstall Requested?" is made. If the argument is true, the system cleans up the conduit at step 220. If the argument is false, the system initializes the conduit at step 230.

At step 240, the conduit name and version number are provided to the requesting application. At step 260 the conduit is opened. At step 270 the files to be moved are copied to the embedded device. At step 280 the conduit is closed.

Synching Operation

Figure 3:
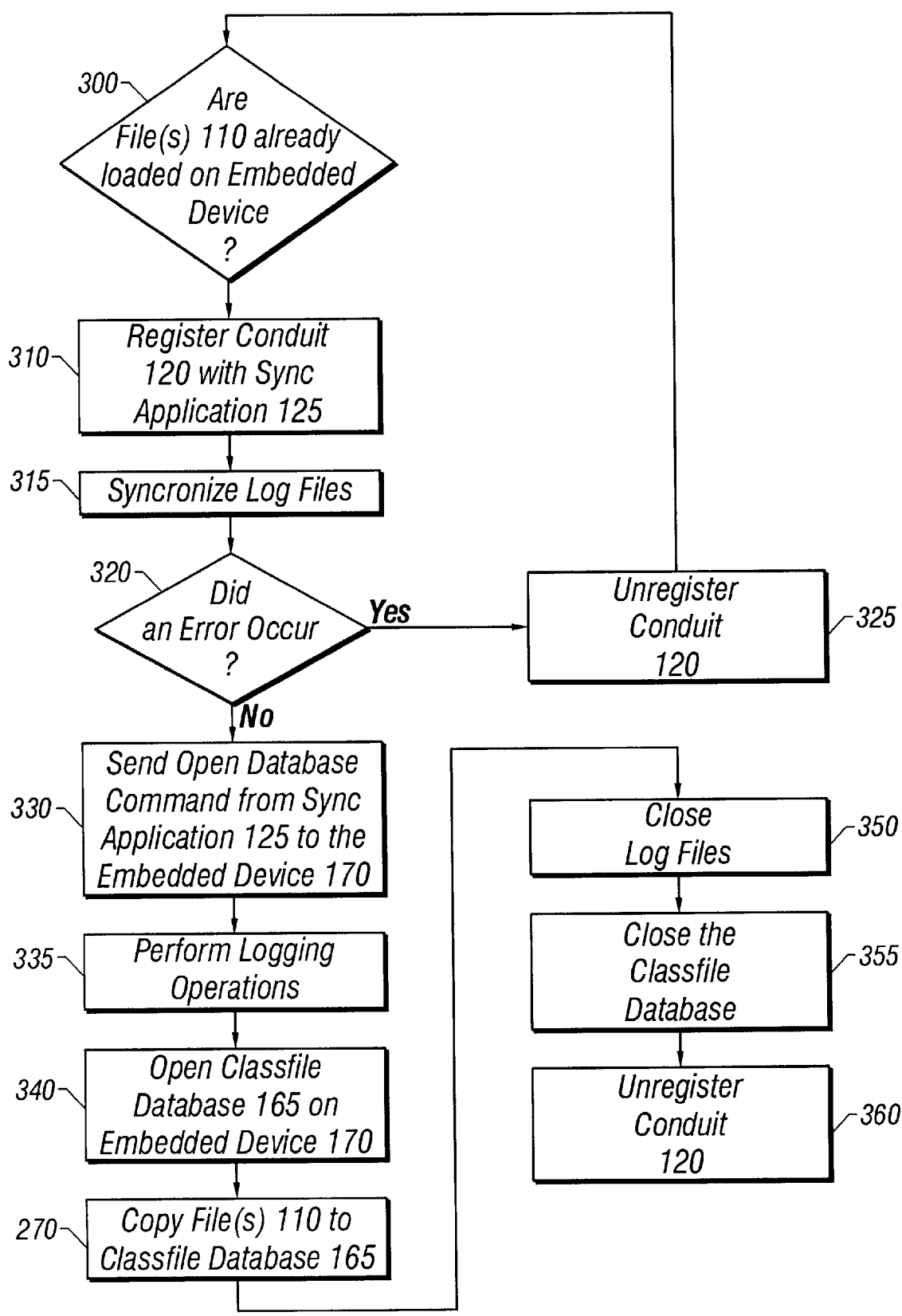
FIG. 3 is a flow diagram illustrating the synching operation of an embodiment of the invention.

FIG. 3 is a flow diagram illustrating the synching operation of an embodiment of the invention. At decision block 300 the argument "Are Files 110 already loaded on Embedded Device?" is made. If the argument is true, the system stops. If the argument is false, the system registers conduit 120 with synching application 125 at step 310. At step 315 the log files of the embedded device and the synching computer are synchronized.

At decision block 320 the argument "Did an Error Occur?" is made. If the argument is true, the conduit is unregistered at step 325 and the system returns to step 300. If the argument is false, the system sends an OpenDatabase command from the synching application 125 to the embedded device 170 at step 330. At step 335 the logging operations are performed. At step 340 the classfile database 165 on embedded device 170 is opened. At step 270 the files 110 are copied to the classfile database 165. At step 350 all log files are closed. At step 355 the classfile database is closed, and at step 360 the conduit is unregistered.

Figure 4:
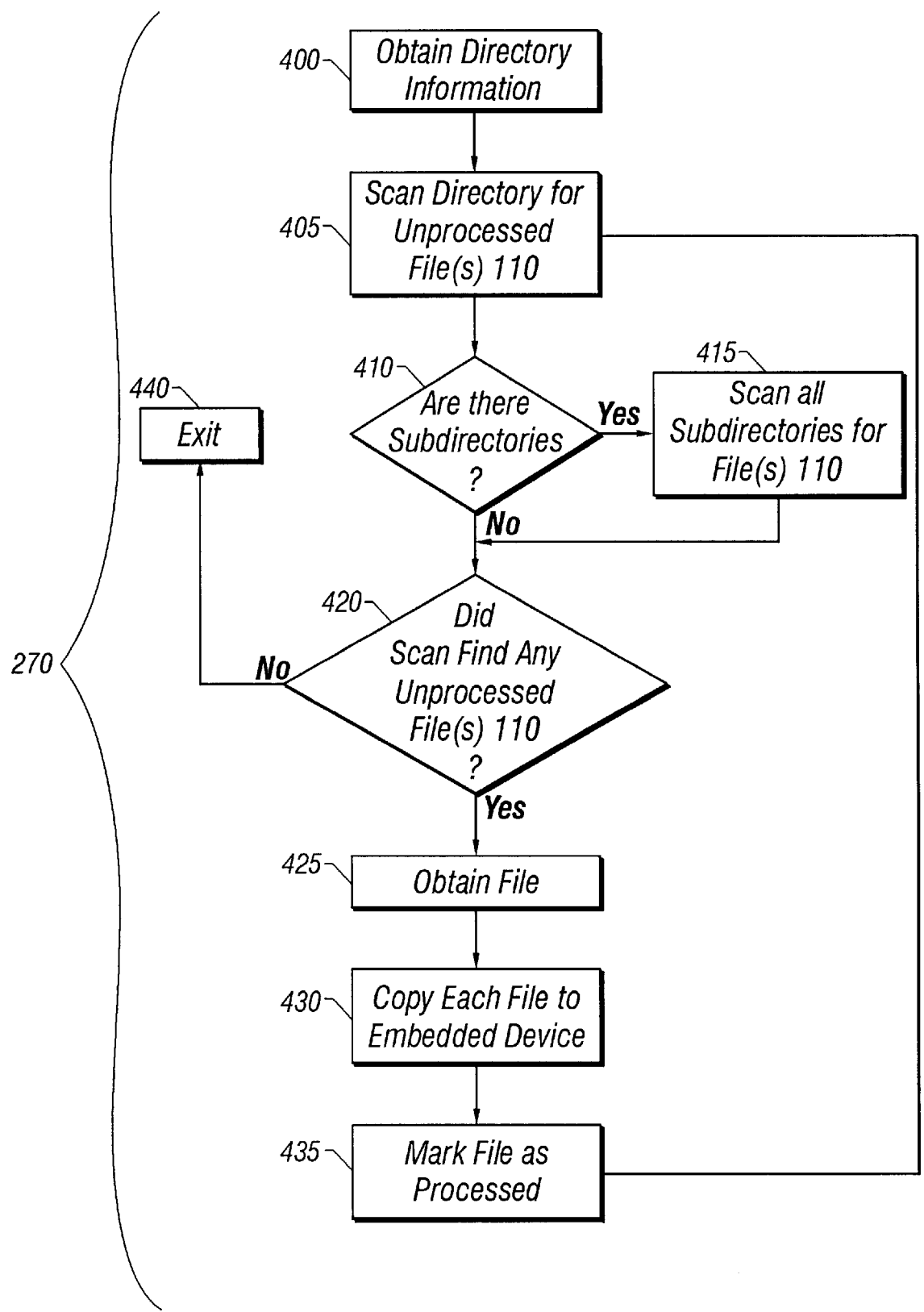
FIG. 4 is a flow diagram illustrating the operation of the copying step 270 of FIGS. 2 and 3.

FIG. 4 is a flow diagram illustrating the operation of the copying step 270 of FIGS. 2 and 3. At step 400 the system obtains directory information. At step 405 the directory is scanned for unprocessed files. At decision block 410 the argument "Are there Subdirectories?" is made. If the argument is true, all subdirectories are scanned for files at step 415. If the argument is false, the system proceeds to decision block 420 and the argument "Did Scan Find Any Unprocessed Files?" If the argument is false, the system exits at step 440. If the argument is true, the file is obtained at step 425. At step 430, each file is copied to the embedded device and the file is marked as processed at step 435. The system then returns to step 405.

Figure 5:
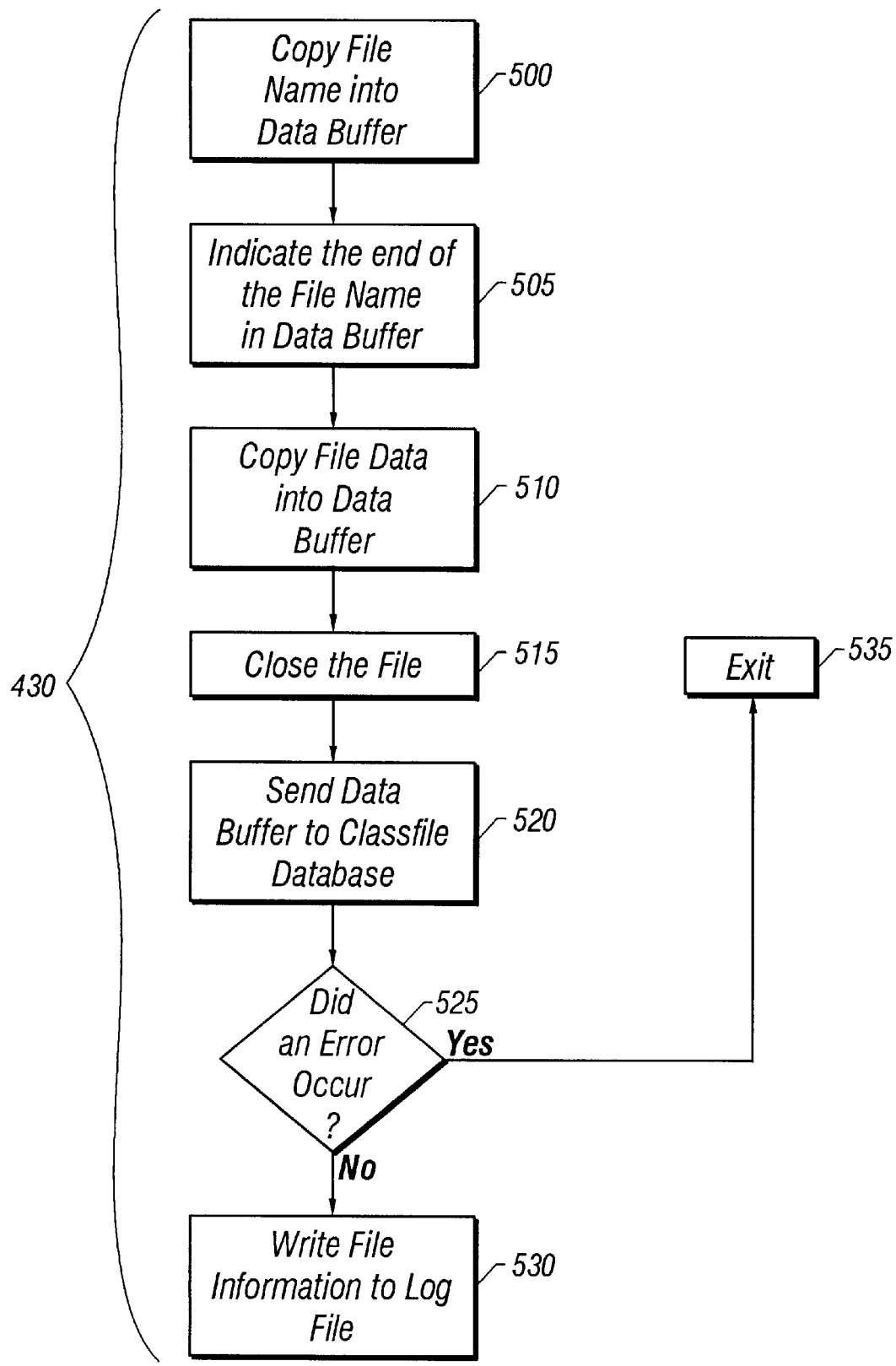
FIG. 5 is a flow diagram illustrating the operation of the copying step 430 of FIG. 4.

FIG. 5 is a flow diagram illustrating the operation of the copying step 430 of FIG. 4. At step 500 the file name is copied into a data buffer. At step 505 the end of the file name is indicated in the data buffer. At step 510 the data from the file is copied into the data buffer.contents is sent. At step 515 the file is closed. At step 520 the data buffer is sent to the classfile database on the embedded device. At decision block 525 the argument "Did an Error Occur?" is made. If the argument is true, the system exits at step 535. If the argument is false, file information is written to a log file at step 530.

Operation of Embedded Device

Once the files have been transferred to the embedded device, they may be used in connection with the local virtual machine. An application provides displays and menus for selection of classes and applications. The classes reside in a database on the embedded device.

Database Manager (Class Manager)

The class manager resides on the embedded device and is used to provide access for the virtual machine to the classfiles in the local database. An example of its operation is given here in connection with a PDA such as the PalmPilot.

The class manager and virtual machine are bundled together into a single PalmPilot application, with the class manager as the user interface. The application is a "prc" file and is installed using the PalmPilot Install Tool on an associated computer system. When installed, the application appears on the PalmPilot's Application Menu. The class manager uses standard PalmPilot database system calls to read and delete database records (classes). PalmPilot database systems, "prc" files, PalmPilot HotSync operations, and the PalmPilot operating system and software developers kits may be found at www.palmpilot.com and are incorporated herein by reference.

The invention has application not only to PDAs such as the PalmPilot, but to any embedded device as well. In operation, the embedded device will have one or more classfiles for execution on an embedded virtual machine. The embedded device may be physically linked to a classfile source, but can operate without a persistent electrical connection to the classfile source. In addition, the invention contemplates operation in the absence of any link whatsoever between the embedded device and the classfile source. The link (physical or electrical), may only be required to update one or more executable applications on the embedded device.

The database manager displays a list of the loaded classes and their respective sizes. The user can select a class to run, at which point the database manager starts the resident virtual machine. An example of the resident virtual machine is described in section 2.16.1 of the Java Virtual Machine Specification (JVMS).

Classfile Database

The classfile database is named "database" in one embodiment and is implemented in the PalmPilot format for databases in the example shown. The format for PalmPilot databases is described www.palmpilot.com. The PalmPilot includes an application referred to as "Memory". This application illustrates the number of records that are contained in an application that can store multiple records. In the case of the database of the present invention, each record represents a classfile, so that the number of records displayed by the Memory application represents the number of classfiles in the database.

The operation of the class manager and the embedded virtual machine on the embedded device is illustrated in FIGS. 6 through 12.

Figure 6:
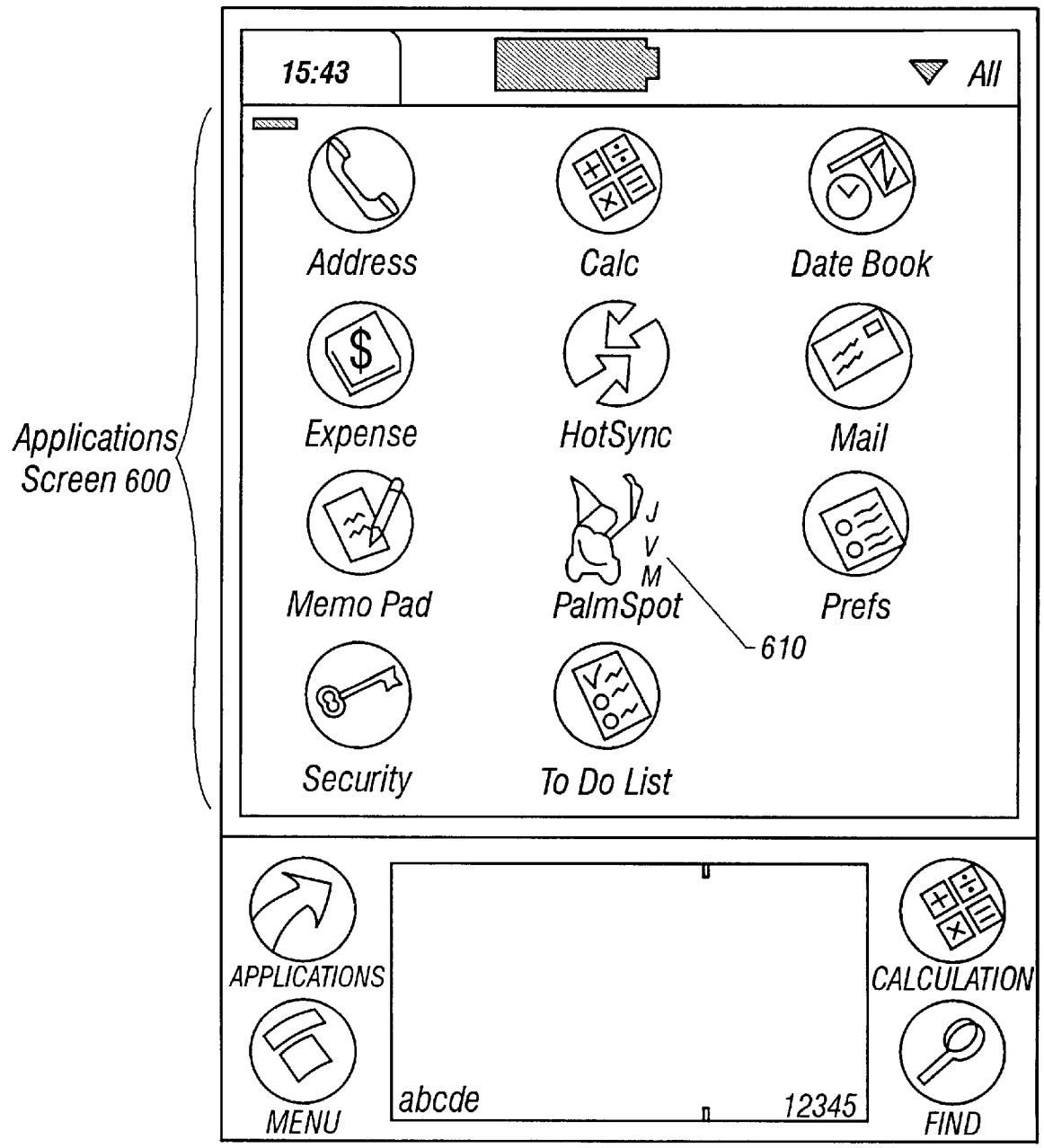
FIG. 6 illustrates an embodiment of a PDA that includes the embedded virtual machine application.

FIG. 6 illustrates an embodiment of a PDA that includes the embedded virtual machine application. The embedded virtual machine application 610 appears in the applications menu screen 600 of the PDA. The application is invoked by selecting it via activation of the touch screen of the PDA.

Figure 7:
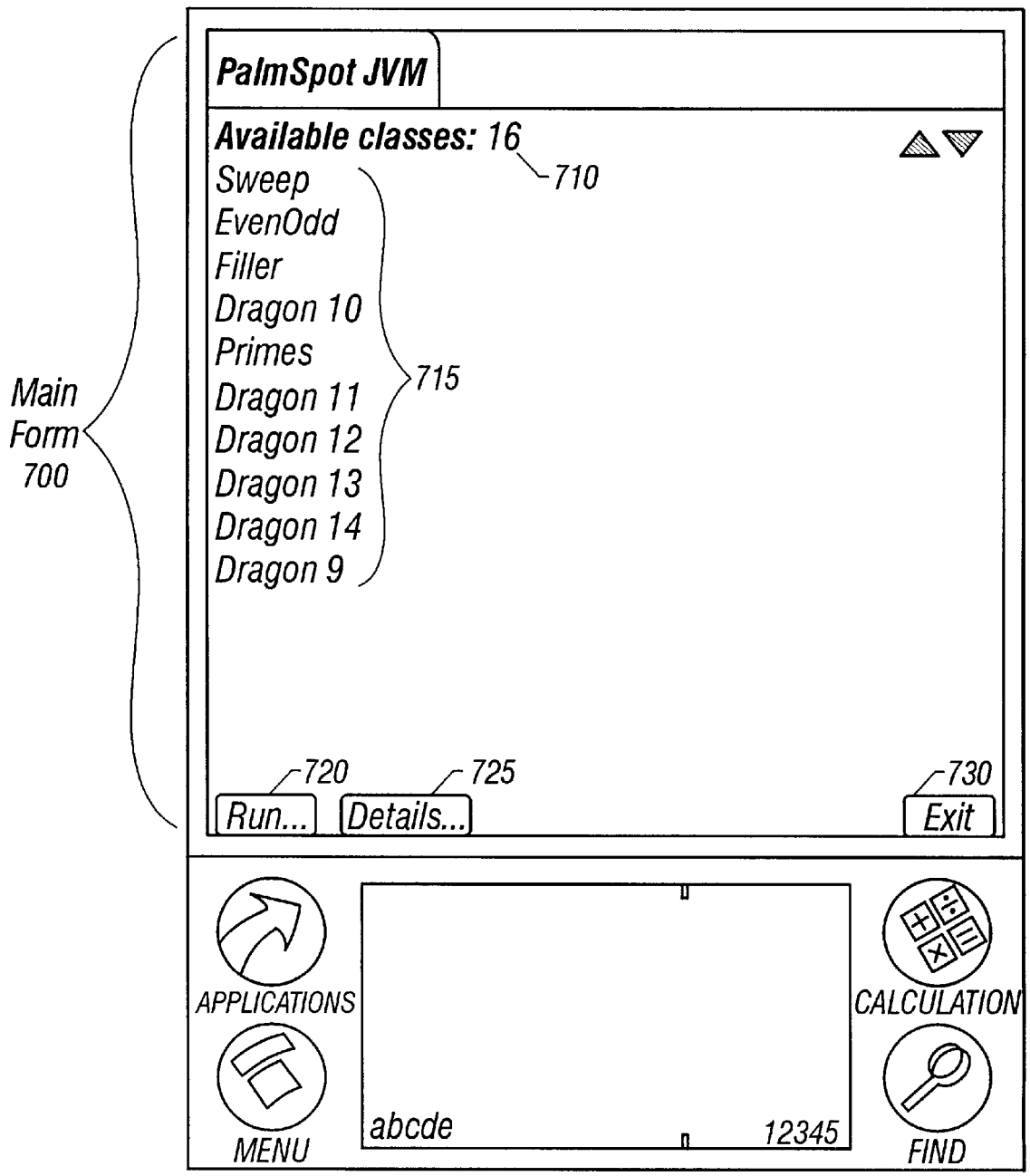
FIG. 7 illustrates the list of available classfiles on the PDA when the application is invoked.

FIG. 7 illustrates the list of available classfiles on the PDA when the application is invoked. The class files are presented in main form 700. Main form 700 displays the number of available classes 710, a list of the available classes 715, a "Run" button 720, a "details" button 725, and an "exit" button 730. The exit button 730 returns the user to the main applications menu 600 of FIG. 6. When one of the files 715 has been selected, it can be run by selecting the run button 720, or more information about the file can be obtained by selecting the details button 725.

Figure 8:
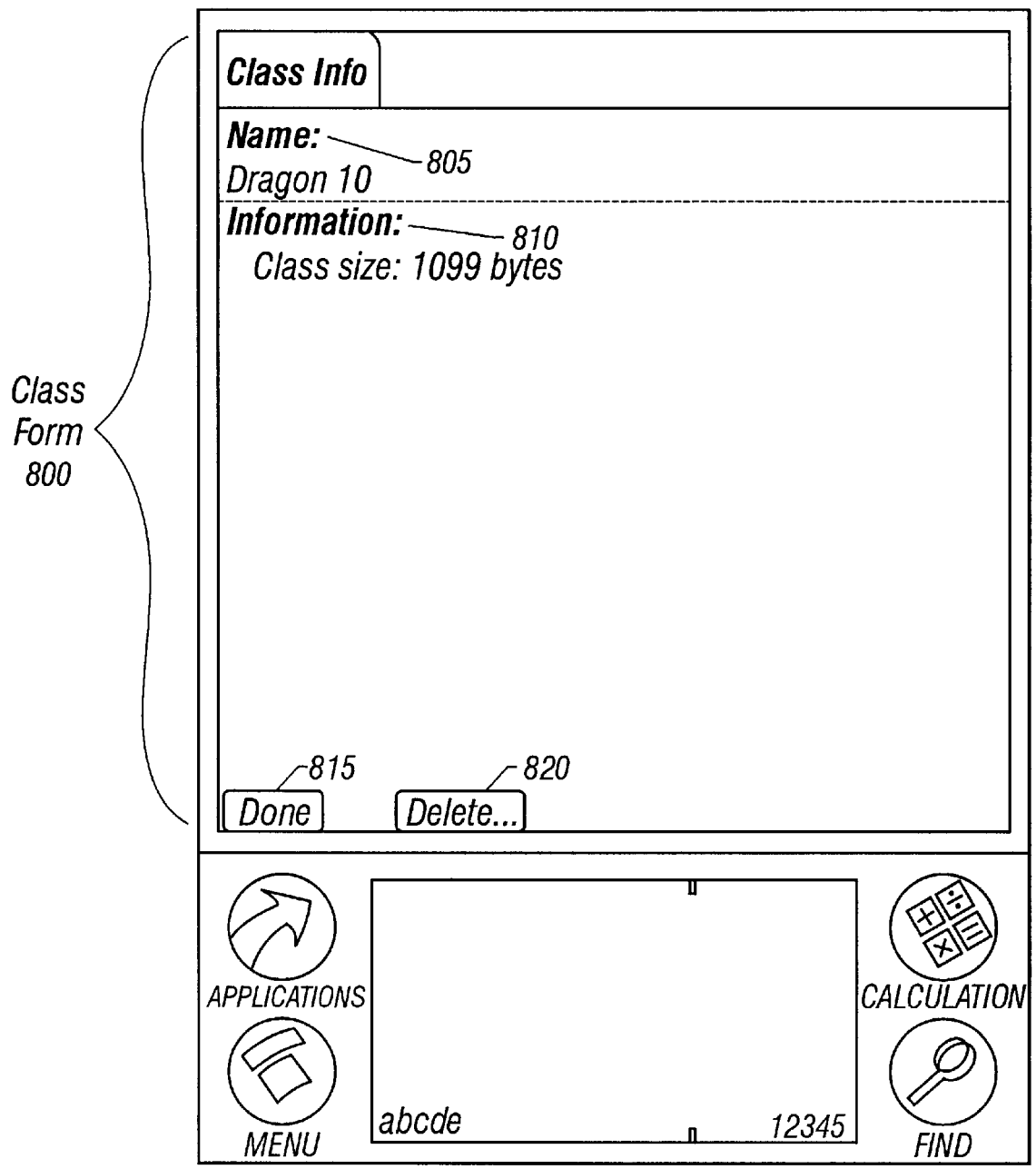
FIG. 8 illustrates the information provided by selecting details in FIG. 7.

FIG. 8 illustrates the information provided by selecting details in FIG. 7. The example illustrates the detail information for the file Dragon10. The class form 800 provides the name field 805, information field 810 (with, for example, class size), a done button 815 and delete button 820. Selecting the done button 815 returns to the main form of FIG. 7. Selecting the delete button 820 deletes the selected class.

Figure 9:
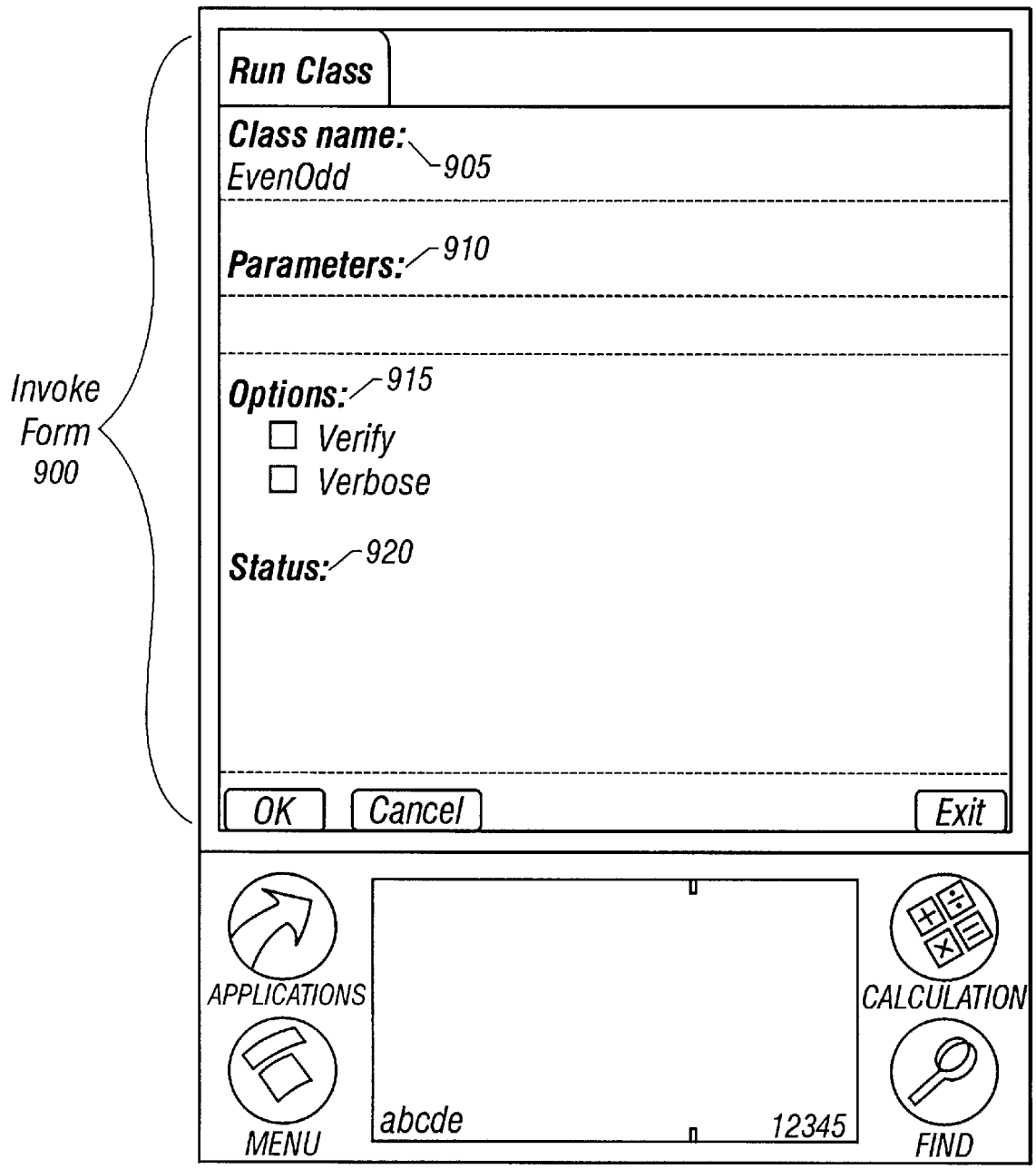
FIG. 9 illustrates the display when the run button is selected in FIG. 6.

FIG. 9 illustrates the display when the run button is selected in FIG. 6. The invoke form 900 of FIG. 9 includes a class name field 905, parameters field 910, options field 915, and status field 920. The invoke form also includes buttons "OK", "Cancel", and "Exit". The class name field 905 includes the name of the selected class. The parameters field 910 permits, when available, the insertion or designation of parameters for the application to be run. When the verify option is selected, the system verifies the classfiles being executed, if a verifier is present. When the verbose option is selected, a display of the methods being executed is provided in status field 920. The OK button invokes the application, the cancel button returns to the main form 700 of FIG. 7, and the exit button returns to the applications screen 600 of FIG. 6.

Embedded Virtual Machine Operation

Figure 10:
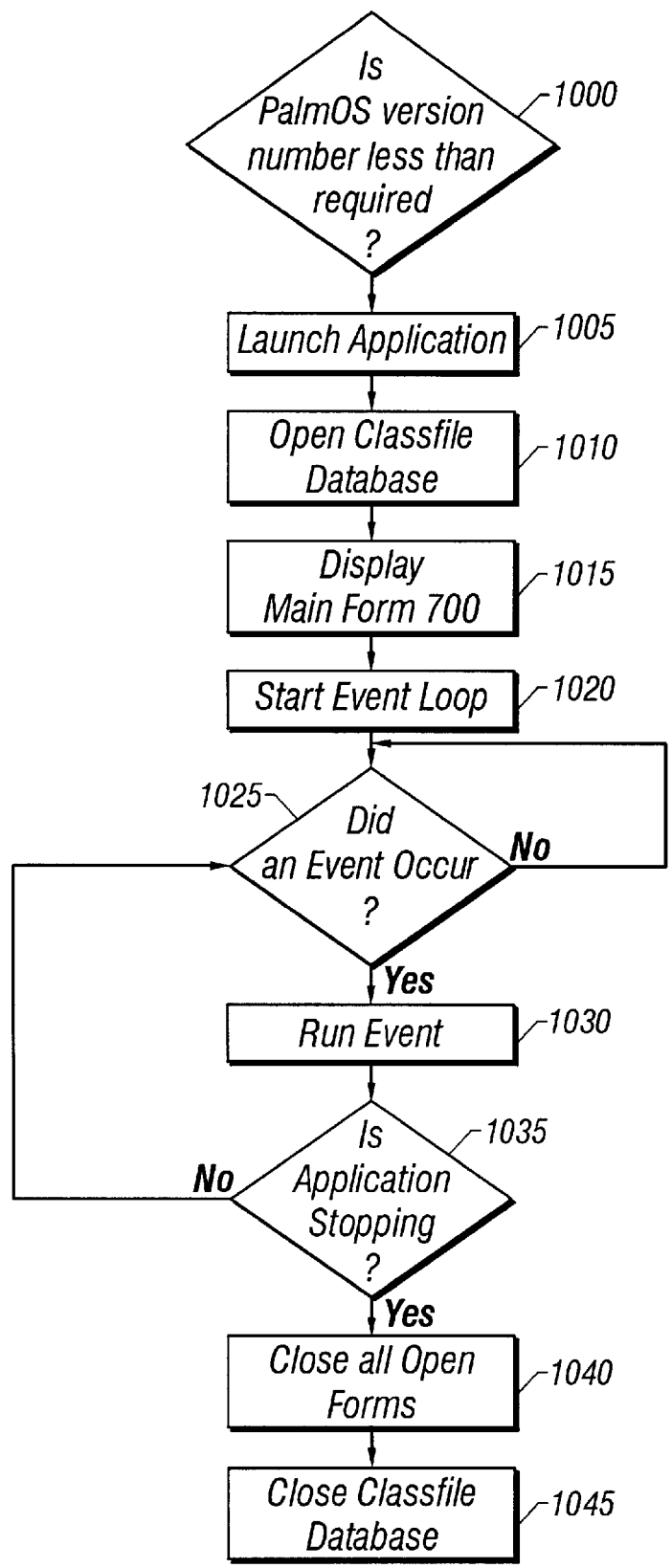
FIG. 10 is a flow diagram illustrating the operation of the embedded virtual machine application when invoked from the applications menu.

FIG. 10 is a flow diagram illustrating the operation of the embedded virtual machine application when invoked from the applications menu. At decision block 1000 the argument "Is PalmOS version number less than required?" is made. If the argument is true, the embedded virtual machine application cannot be invoked. If the argument is false, the application is launched at step 1005. At step 1010 the classfile database is opened. At step 1015 the main form 700 is displayed and the event loop begins at step 1020.

At decision block 1025 the argument "Did an Event Occur?" is made. If no, the system continues in the event loop. If yes, the system runs the event at step 1030. At decision block 1035 the argument "Is Application Stopping?" is made. If the argument is false, the system returns to step 1025. If the argument is true, the system closes all open forms at step 1040 and closes the classfile database at step 1045.

Figure 11:
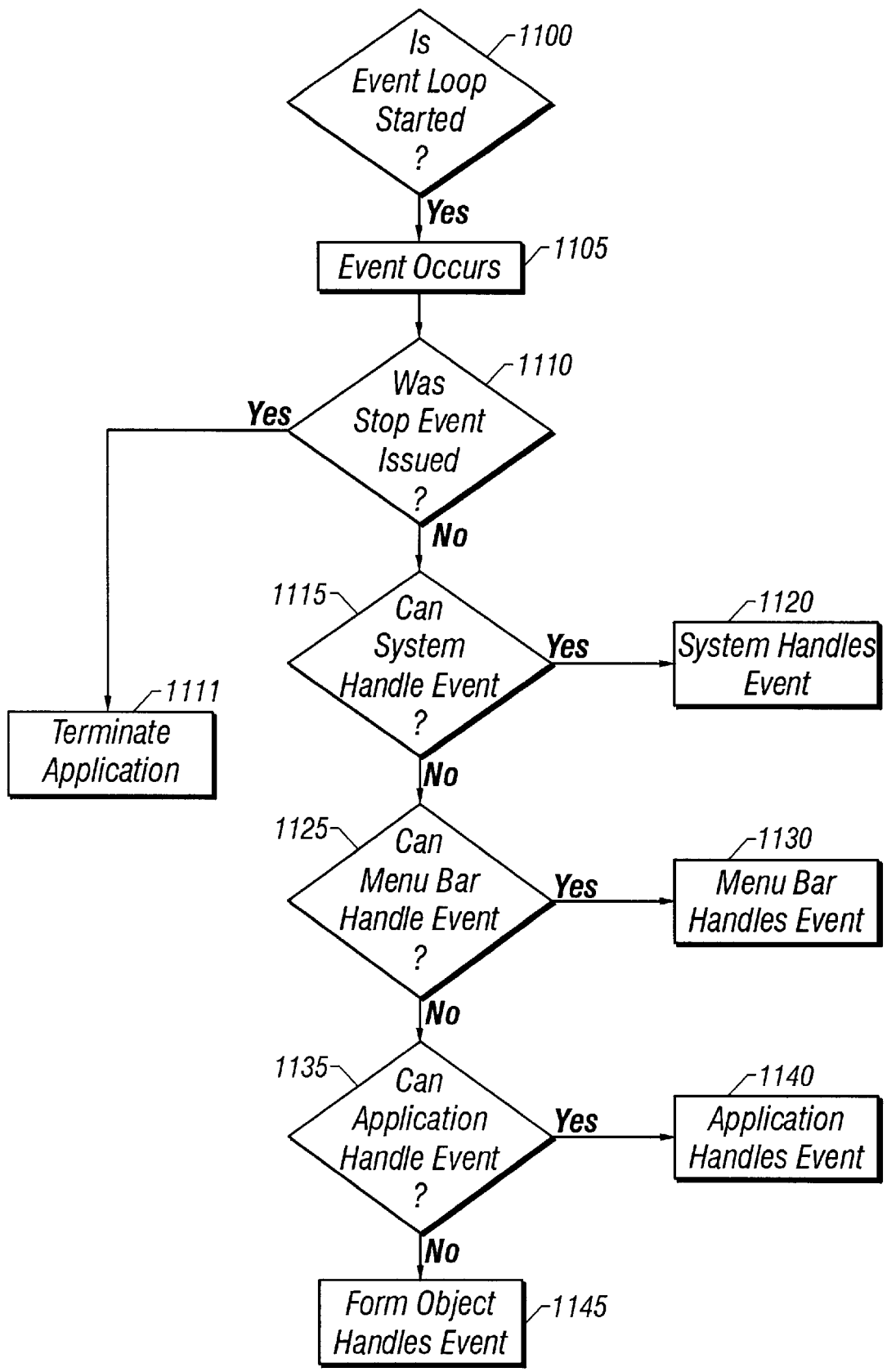
FIG. 11 is a flow diagram illustrating an event loop operation.

FIG. 11 is a flow diagram illustrating an event loop operation. At decision block 1100 the argument "Is Event Loop Started?" is made. If the argument is true, the event occurs at step 1105. Decision block 1110 determines if a stop event was issued. If yes, the application is terminated at step 1111. If no, the system checks to see if the system can handle the event at decision block 1115. If yes, the system handles the event at step 1120. If no, the system checks to see of the menu bar can handle the event at decision block 1125. If yes, the menu bar handles the event at step 1130. If no, the system checks to see if the application can handle the event at decision block 1135. IF yes, the application handles the event at step 1140. If no, the form object handles the event at step 1145.

Class Manager Operation

Figure 12:
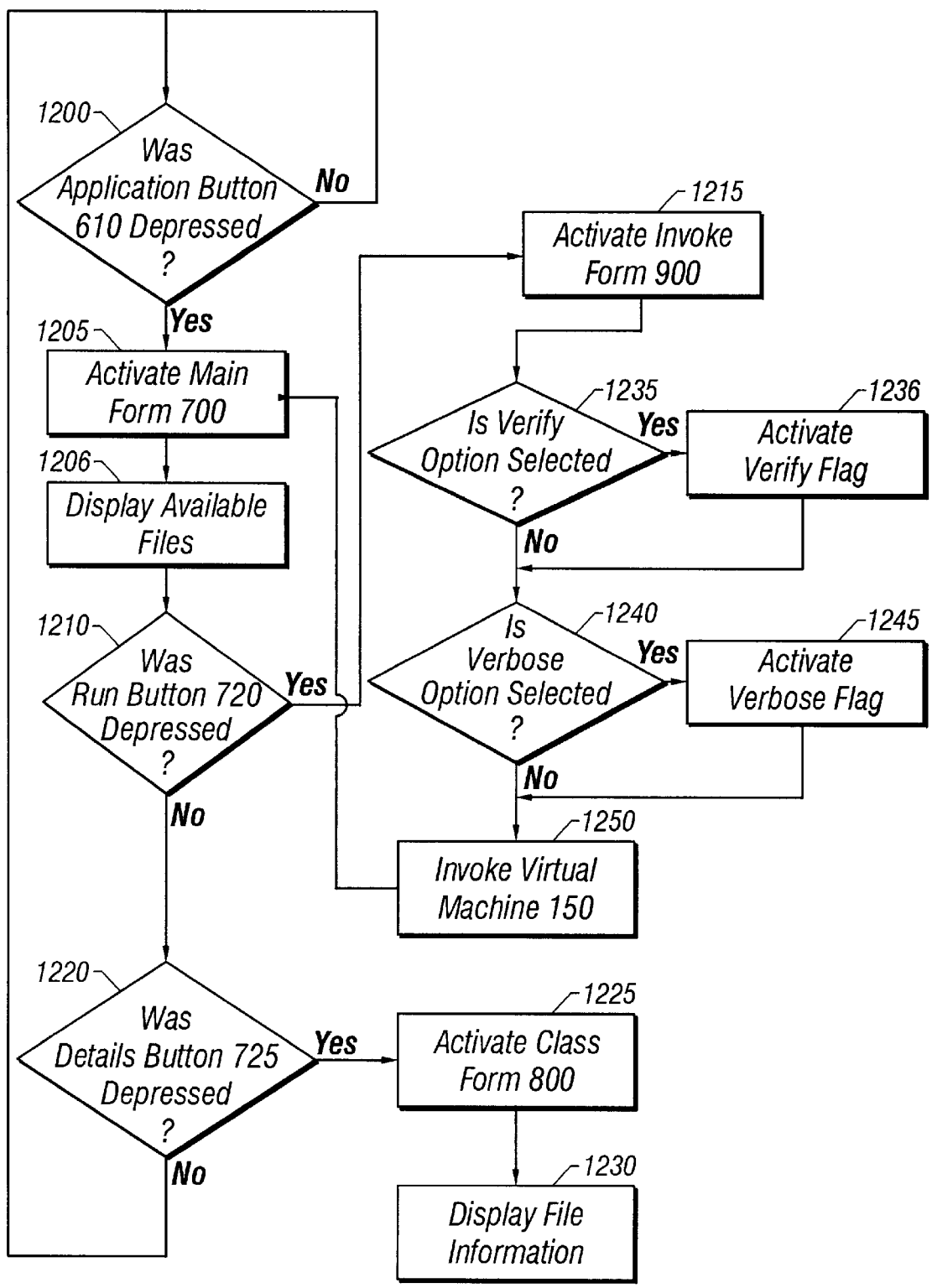
FIG. 12 is a flow diagram illustrating the operation of the class manager.
Figure 13:
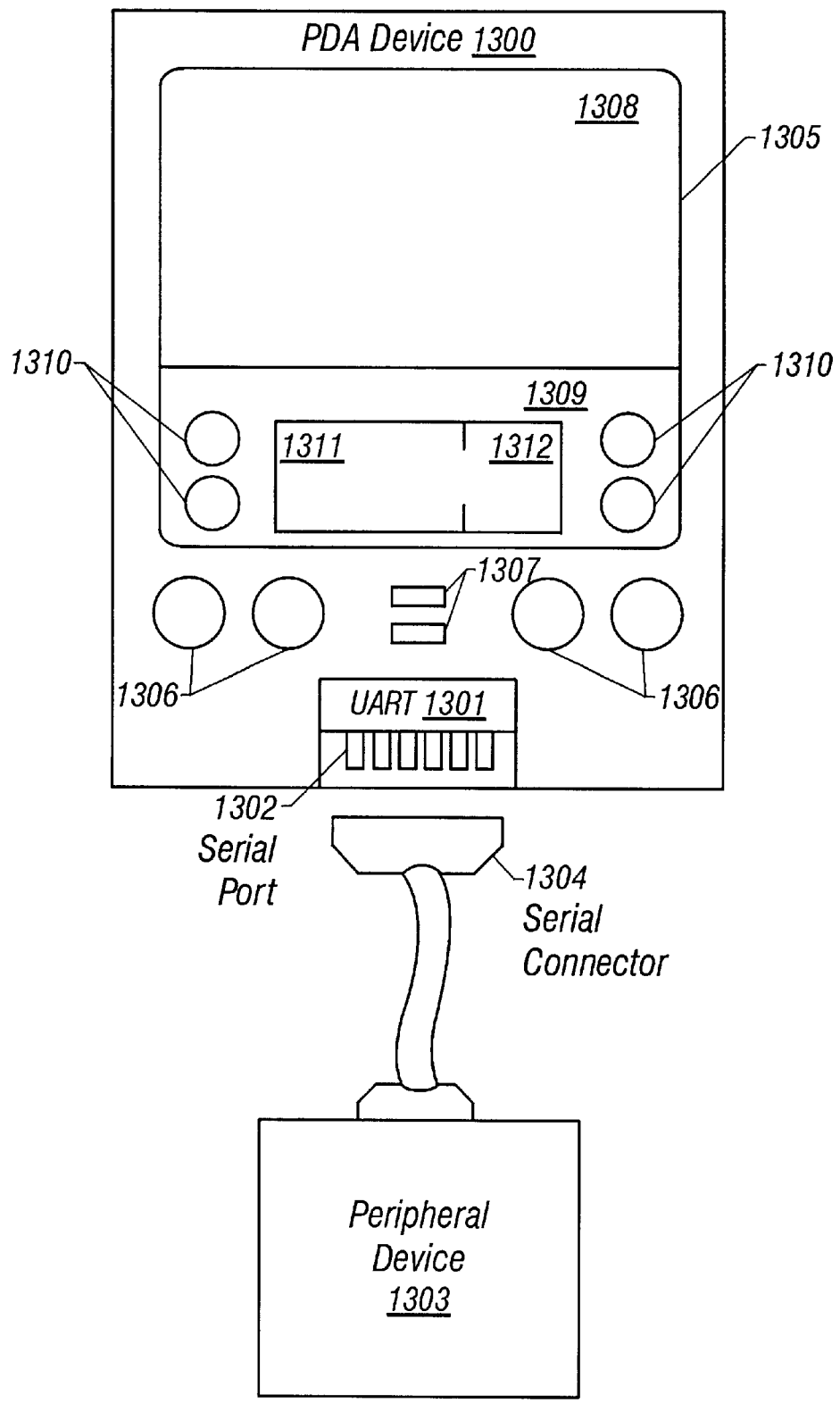
FIG. 13 is a block diagram of a personal digital assistant coupled to a peripheral device.

FIG. 12 is a flow diagram illustrating the operation of the class manager. At decision block 1200 the argument "Was Application Button 610 Depressed?" is made. If the argument is false, the system loops back to block 1200. If the argument is true, the system activates the main form 700 for display at step 1205. The available files are displayed at step 1206. At decision block 1210 the argument "Was Run Button 720 Depressed?" is made. If the argument is false, the system proceeds to decision block 1220 to see if the details button 725 was depressed. If yes, the system activates the class form 800 at step 1225 and displays the file information at step 1230. If no, the system loops back to decision block 1200.

If the argument at decision block 1210 is true, the invoke form 900 is activated at step 1215. At decision block 1235 a test for the verify option is made. If yes, the verify flag is activated at step 1236. If no, a test for the verbose option is made at decision block 1240. If yes, the verbose flag is activated at step 1245. If no, the virtual machine is invoked at step 1250. After the execution of a selected program, the system returns to the class manager and main form 700 (step 1205).

Other Embodiments

The invention is described above in connection with an embedded device that has a graphical interface. The invention has equal application to embedded devices that do not have graphical interfaces or any interface. These environments include household appliances, (toasters, microwaves) or other devices with no interface or limited interface (cell phone, smartcards). In those environments, the class manager selects one or more appropriate classfiles for execution by the EVM. When the embedded device is coupled to a classfile source, the class manager directs the loading of replacement and/or additional classfiles for execution by the EVM. For example, the appliance could be upgraded by connecting the device to a classfile source. The class manager compares the resident version of the classfile or classfiles on the embedded device with the available classfile or classfiles on the classfile source and loads newer versions if available.

Classfile Source

The classfile source could be found on a network or on a computer system such as the one described in FIG. 14. A keyboard 1410 and mouse 1411 are coupled to a bidirectional system bus 1418. The keyboard and mouse are for introducing user input to the computer system and communicating that user input to processor 1413. Other suitable input devices may be used in addition to, or in place of, the mouse 1411 and keyboard 1410. I/O (input/output) unit 1419 coupled to bi-directional system bus 1418 represents such I/O elements as a printer, A/V (audio/video) I/O, etc.

Computer 1400 includes a video memory 1414, main memory 1415 and mass storage 1412, all coupled to bidirectional system bus 1418 along with keyboard 1410, mouse 1411 and processor 1413. The mass storage 1412 may include both fixed and removable media, such as magnetic, optical or magnetic optical storage systems or any other available mass storage technology. Bus 1418 may contain, for example, thirty-two address lines for addressing video memory 1414 or main memory 1415. The system bus 1418 also includes, for example, a 32-bit data bus for transferring data between and among the components, such as processor 1413, main memory 1415, video memory 1414 and mass storage 1412. Alternatively, multiplex data/address lines may be used instead of separate data and address lines.

In one embodiment of the invention, the processor 1413 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 1415 is comprised of dynamic random access memory (DRAM). Video memory 1414 is a dual-ported video random access memory. One port of the video memory 1414 is coupled to video amplifier 1416. The video amplifier 1416 is used to drive the cathode ray tube (CRT) raster monitor 1417. Video amplifier 1416 is well known in the art and may be implemented by any suitable apparatus. This circuitry converts pixel data stored in video memory 1414 to a raster signal suitable for use by monitor 1417. Monitor 1417 is a type of monitor suitable for displaying graphic images.

Computer 1400 may also include a communication interface 1420 coupled to bus 1418. Communication interface 1420 provides a two-way data communication coupling via a network link 1421 to a local network 1422. For example, if communication interface 1420 is an integrated services digital network (ISDN) card or a modem, communication interface 1420 provides a data communication connection to the corresponding type of telephone line, which comprises part of network link 1421. If communication interface 1420 is a local area network (LAN) card, communication interface 1420 provides a data communication connection via network link 1421 to a compatible LAN. Wireless links are also possible. In any such implementation, communication interface 1420 sends and receives electrical, electromagnetic or optical signals which carry digital data streams representing various types of information.

Network link 1421 typically provides data communication through one or more networks to other data devices. For example, network link 1421 may provide a connection through local network 1422 to local server computer 1423 or to data equipment operated by an Internet Service Provider (ISP) 1424. ISP 1424 in turn provides data communication services through the world wide packet data communication network now commonly referred to as the "Internet" 1425. Local network 1422 and Internet 1425 both use electrical, electromagnetic or optical signals which carry digital data streams. The signals through the various networks and the signals on network link 1421 and through communication interface 1420, which carry the digital data to and from computer 1400, are exemplary forms of carrier waves transporting the information.

Computer 1400 can send messages and receive data, including program code, through the network(s), network link 1421, and communication interface 1420. In the Internet example, remote server computer 1426 might transmit a requested code for an application program through Internet 1425, ISP 1424, local network 1422 and communication interface 1420.

The received code may be executed by processor 1413 as it is received, and/or stored in mass storage 1412, or other non-volatile storage for later execution. In this manner, computer 1400 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method and apparatus for managing classfiles on a device without a file system has been described in conjunction with one or more specific embodiments. The invention is defined by the claims and their full scope of equivalents.

We claim:

1. An apparatus comprising:
   an embedded device containing a virtual machine, wherein said embedded device operates without file system;
   a database on said embedded device for storing at least one classfile said virtual machine loading a required classfile for execution from said database;
   a connector for coupling said embedded device to a classfile source for selectively downloading said at least one classfile from said classfile source into said database, wherein said classfile source is external to said embedded device, wherein said coupling and said downloading occurs if said required classfile is not one of said at least one classfile in said database.

2. The apparatus of claim 1 wherein said classfile source comprises a host computer system.

3. The apparatus of claim 1 wherein said connector communicates with said classfile source by carrier wave.

4. The apparatus of claim 1 wherein said connector communicates with said classfile source via a hard-wired connection.

5. The apparatus of claim 1 further including an application manager on said embedded device for identifying said at least one classfile to be downloaded from said classfile source.

6. The apparatus of claim 1 wherein said embedded device comprises a personal digital assistant.

7. The apparatus of claim 1 wherein said at least one classfile comprises bytecodes of a platform independent programming language.

8. The apparatus of claim 7 wherein said independent programming language comprises Java programming language.

9. The apparatus of claim 1 wherein said downloading of said at least one classfile is accomplished using a synching operation.

10. An apparatus comprising:
    a classfile source;
    an embedded device operating without a file system, wherein said embedded device is periodically synchronized during a synching operation via a temporary communications link to said classfile source, said communications link having a physical link that is periodically in connection with said classfile source;
    a virtual machine executing in said embedded device;
    a database of at least one classfile integrally located in said embedded device;
    an applications manager in said embedded device for identifying said at least one classfile to be loaded into said database during said synching operation, said applications manager providing one or more required classfiles from said database for execution by said virtual machine, wherein said at least one classfile to be loaded is said one or more required classfiles not in said database.

11. The apparatus of claim 10 wherein said classfile source is available on a network.

12. The apparatus of claim 10 wherein said communications link is accomplished via carrier wave.

13. The apparatus of claim 10 wherein said at least one classfile comprises a platform independent programming language classfile.

14. The apparatus of claim 13 wherein said platform independent programming language comprises Java programming language.

15. The apparatus of claim 11 wherein said network comprises at least one host computer and said classfile source resides on said host computer.

16. The apparatus of claim 10 wherein said embedded device comprises a personal digital assistant.

17. A method of providing at least one classfile on an embedded device comprising:
    providing a virtual machine in an embedded device, wherein said embedded device operates without a file system;
    providing a database in said embedded device for storing at least one classfile for execution by said virtual machine, said virtual machine loading a required classfile for execution from said database;
    connecting means for temporarily coupling said embedded device to a classfile source for selectively downloading said at least one classfile from said classfile source into said database, said connecting means having a connector that allows said embedded device to communicates with said classfile source, wherein said classfile source is external to said embedded device, said coupling and said downloading occurring if said required classfile is not one of said at least one classfile in said database.

18. The method of claim 17 wherein said classfile source comprises a host computer system.

19. The method of claim 17 wherein said connector communicates with said classfile source by carrier wave.

20. The method of claim 17 wherein said connector communicates with said classfile source via a hard wired connection.

21. The method of claim 17 further including providing an application manager on said embedded device for identifying said at least one classfile to be downloaded from said classfile source.

22. The method of claim 17 wherein said embedded device comprises a personal digital assistant.

23. The method of claim 17 wherein said at least one classfile comprises bytecodes of a platform independent programming language.

24. The method of claim 23 wherein said independent programming language comprises Java programming language.

25. The method of claim 17 wherein said downloading of said at least one classfile is accomplished using a synching operation.

26. A method of providing at least one classfile on an embedded device comprising:

providing a classfile source;

periodically synchronizing an embedded device using a synching operation via a temporary communications link to said classfile source, wherein said classfile source is external to said embedded device, said communications link having a physical link periodically in connection with said classfile source, wherein said embedded device operates with a file system;

providing a virtual machine executing in said embedded device;

providing a database of at least one classfile integrally located in said embedded device;

identifying at least one classfile to be loaded into said database during said synching operation using an applications manager in said embedded device;

providing one or more required classfiles from said database for executing by said virtual machine, wherein said at least one classfile to be loaded is said one or more required classfile not in said database.

27. The method of claim 26 wherein a classfile source is available on a network.

28. The method of claim 26 wherein said communications link is accomplished via carrier wave.

29. The method of claim 26 wherein said at least one classfile comprises a platform independent programming language classfile.

30. The method of claim 29 wherein said platform independent programming language comprises Java programming language.

31. The method of claim 30 wherein said network comprises at least one host computer and said classfile source resides on said host computer.

32. The method of claim 26 wherein said embedded device comprises a personal digital assistant.

33. A method for loading a classfile from a host computer onto an embedded device coupled to said host computer comprising:

identifying a classfile to be loaded from a classfile source in a host computer onto an embedded device, wherein said embedded device operates without a file system;

initiating a conduit on said host computer, said conduit providing a connection between said classfile source and said embedded device such that at least one classfile may be transferred between said classfile source and said embedded device;

registering said conduit with a synching application on said host computer, wherein said synching application provides synchronization of classfiles in said classfile source and said embedded device;

causing a database having said at least one classfile to be opened on said embedded device;

copying said identified classfile from said host computer to said embedded device using said synching application and said conduit;

closing said database in said embedded device after completion of said copying; and unregistering said conduit with said synching application on said host computer after closing said database.

34. The method of claim 33 wherein said copying said identified classfile to said embedded comprises:

obtaining a directory having said identified classfile;

scanning said directory to determine if said identified classfile has been processed;

obtaining said identified classfile when said identified classfile has not been processed;

copying said identified classfile to said embedded device;

marking said identified classfile as processed in said directory.

35. The method of claim 34 further comprising:

sending a file name of said identified classfile to said embedded device;

sending data of said identified classfile to said embedded device;

writing said file name and said data into said database.

36. The method of claim 33 wherein said embedded device comprises a personal digital assistant (PDA).

37. The method of claim 33 wherein said classfile comprises a bytecode file.

38. The method of claim 37 wherein said bytecode file is a Java™ bytecode file.

* * * * *